United States Patent
Kryzak

(10) Patent No.: US 8,770,893 B2
(45) Date of Patent: *Jul. 8, 2014

(54) APPARATUS, SYSTEM AND METHOD FOR RECOVERY OF ARTIFACTS AND ERADICATION OF INVASIVE SPECIES IN AQUATIC ENVIRONMENTS

(76) Inventor: Thomas J. Kryzak, Altamont, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/041,840

(22) Filed: Mar. 7, 2011

(65) Prior Publication Data

US 2011/0158749 A1 Jun. 30, 2011

Related U.S. Application Data

(63) Continuation of application No. 12/352,295, filed on Jan. 12, 2009, now Pat. No. 7,922,425, which is a continuation of application No. 11/688,860, filed on Mar. 20, 2007, now Pat. No. 7,497,645.

(60) Provisional application No. 60/783,794, filed on Mar. 20, 2006.

(51) Int. Cl.
*C02F 1/48* (2006.01)

(52) U.S. Cl.
USPC ........................................ 405/185; 405/195.1

(58) Field of Classification Search
USPC .................. 441/38; 405/185, 190, 191, 195.1
See application file for complete search history.

(56) References Cited

U.S. PATENT DOCUMENTS

| | | | |
|---|---|---|---|
| 3,762,548 A | 10/1973 | McCabe | |
| 3,843,983 A * | 10/1974 | Tangen | 441/38 |
| 4,047,390 A * | 9/1977 | Boyce, II | 405/188 |
| 4,373,834 A | 2/1983 | Grace | |
| 4,405,258 A * | 9/1983 | O'Rourke et al. | 405/60 |
| 4,751,939 A | 6/1988 | Barnay | |
| 4,766,918 A * | 8/1988 | Odekirk | 52/2.23 |
| 4,867,608 A * | 9/1989 | Kinghorn | 405/188 |
| 5,389,266 A | 2/1995 | Clum | |
| 5,597,335 A * | 1/1997 | Woodland | 441/36 |
| 5,645,373 A * | 7/1997 | Jenkins | 405/91 |
| 5,701,839 A * | 12/1997 | Jasper | 114/264 |
| 5,711,886 A | 1/1998 | Long | |
| 5,804,065 A | 9/1998 | Kolz | |
| 5,857,806 A * | 1/1999 | Melin | 405/115 |
| 5,865,564 A * | 2/1999 | Miller et al. | 405/115 |
| 5,971,661 A * | 10/1999 | Johnson et al. | 405/114 |
| 6,132,356 A | 10/2000 | Schabdach et al. | |
| 6,375,529 B1 * | 4/2002 | Infante et al. | 441/38 |
| 6,641,329 B1 * | 11/2003 | Clement | 405/115 |
| 7,497,645 B2 * | 3/2009 | Kryzak | 405/195.1 |
| 7,922,425 B2 * | 4/2011 | Kryzak | 405/195.1 |
| 2002/0133983 A1 | 9/2002 | Chesner | |
| 2004/0181112 A1 | 9/2004 | Essenter | |
| 2005/0045556 A1 | 3/2005 | Kryzak | |

* cited by examiner

*Primary Examiner* — John Kreck
(74) *Attorney, Agent, or Firm* — GFD Patents LLC; Gerald F. Dudding

(57) ABSTRACT

An apparatus, system and method for recovery of artifacts and eradication of invasive species in aquatic environments. The structure may comprise an elongate flexible bladder blanket divider having first and second ends. The structure may have an open bore vertical support operably coupled to the first and second ends. Each end extends into the open bore vertical support and rests on at least one apron bladder of an apron bladder bundle. The at least one apron bladder is contained in the open bore vertical support and at least one apron bladder is between the end of the vertical support and the bottom of the body of water. A method of using the apparatus, comprising providing an apparatus having variable volume first and second compartments separated by a flexible bladder blanket divider; and introducing agents through openings in the bladder to control the growth of or kill the invasive organisms.

37 Claims, 10 Drawing Sheets

600

```
┌─────────────────────────────────┐
│   Continued From Step 640.      │
└─────────────────────────────────┘
                │
                ▼
┌─────────────────────────────────┐
│ removing the resuspended        │
│ contaminated sediment,          │
│ resulting in lowering the       │
│ elongate flexible bladder       │
│ blanket divider so that the     │──660
│ artifact may be extracted with  │
│ a robotic arm, chemicals may    │
│ be introduced using chemical    │
│ injectors to eradicate the      │
│ invasive species, or growth     │
│ packets may be introduced       │
│ using nozzles to revegetate the │
│ bottom of the body of water.    │
└─────────────────────────────────┘
```

Fig. 3B

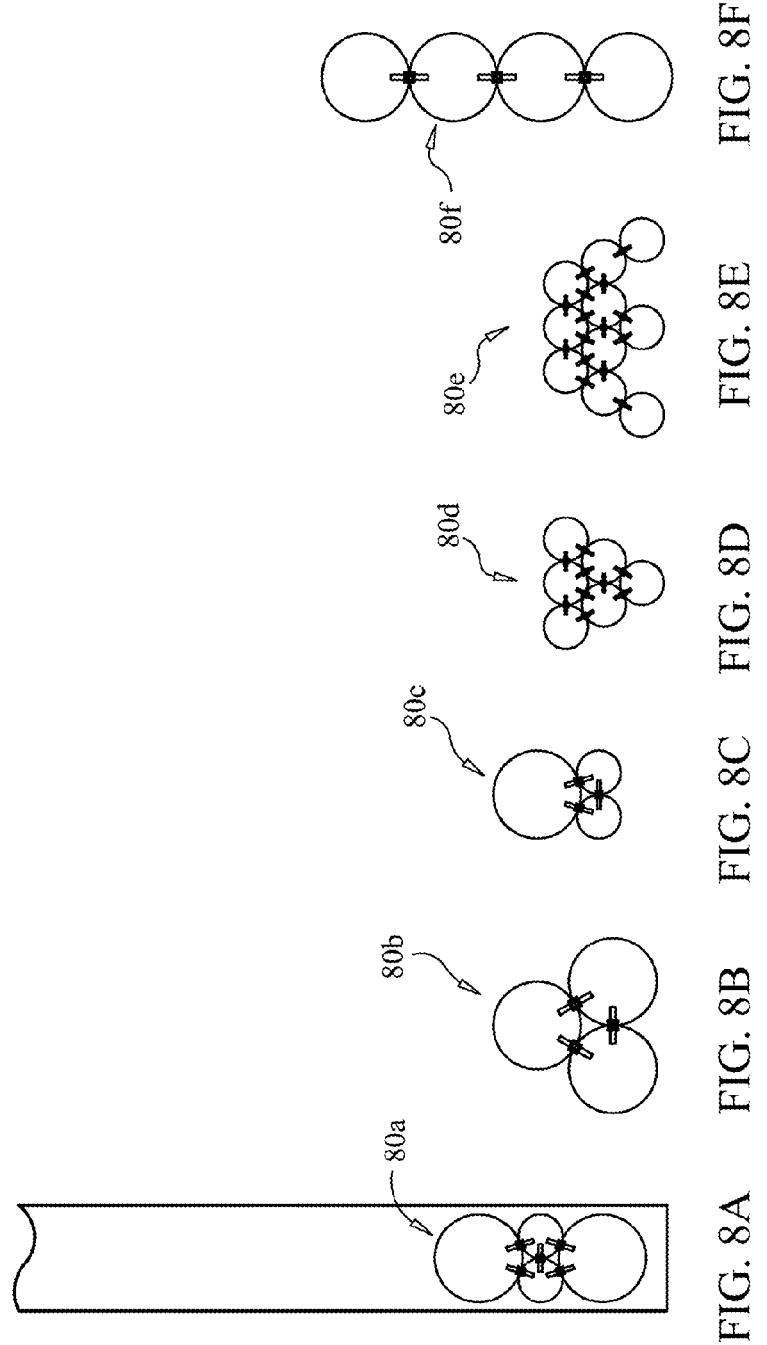

APPARATUS, SYSTEM AND METHOD FOR RECOVERY OF ARTIFACTS AND ERADICATION OF INVASIVE SPECIES IN AQUATIC ENVIRONMENTS

The present patent application is a continuation application claiming priority from non-provisional application Ser. No. 12/352,295 (filed Jan. 12, 2009 and entitled "Apparatus, System and Method for Recovery of Artifacts and Eradication of Invasive Species in Aquatic Environments") which claimed priority from non-provisional application Ser. No. 11/688,860 (filed Mar. 20, 2007 and entitled "Apparatus, System and Method for Recovery of Artifacts and Eradication of Invasive Species in Aquatic Environments") which claimed priority from provisional application Ser. No. 60/783,794 (filed Mar. 20, 2006 and entitled "Stretch Exploration Process For Archaeological Investigative Research And Artifact Recovery Tool And Aquatic Controlled Eradication Systems").

TECHNICAL FIELD

The present invention relates generally to preservation of our natural resources, and more particularly, to an apparatus, system and method for recovery of artifacts and eradication of invasive species in aquatic environments.

BACKGROUND OF THE INVENTION

It has been found that some naturally occurring bodies of water such as lakes, reservoirs, rivers and streams have become contaminated with chemicals, such as, for example, with polychlorinated biphenyls ("PCBs") or chlorinated dioxins. These same bodies of water may house buried artifacts having historical value, because of which, recovery of the artifacts is desirable.

Alternatively, there have been reports of proliferation of invasive plant species in bodies of water. Zebra mussels, Eurasian watermilfoil, ruffe, and other invasive species pose a severe threat to waters and native aquatic plants and animals. Hydrilla is one example of a very invasive plant found "hitchhiking" on rootstocks of ornamental aquatic plants.

There is a need for an apparatus, system and method for recovery of artifacts and eradication of invasive species in aquatic environments.

SUMMARY OF THE INVENTION

A first aspect of the present invention provides an apparatus for recovering historical artifacts, eradicating invasive species, or restoring plant life, comprising: an elongate flexible bladder blanket divider having first and second ends, wherein each end rests on at least one apron bladder of an apron bladder bundle, and wherein each apron bladder is between the respective end of the elongate flexible bladder blanket divider and the bottom of a body of water.

A second aspect of the present invention provides a method of recovering historical artifacts, eradicating invasive species, or revegetating plant life in contaminated bottoms of a body of water, comprising: providing an apparatus comprising: an elongate flexible bladder blanket divider having first and second ends, wherein each end rests on at least one apron bladder of an apron bladder bundle, and wherein each apron bladder is between the respective end of the elongate flexible bladder blanket divider and the bottom of a body of water; and releasably sealing the at least one apron bladder to the bottom of the body of water.

A third aspect of the present invention provides a system for recovering historical artifacts, eradicating invasive species, or restoring plant life in contaminated bottoms of a body of water, comprising: a water craft; an apparatus comprising: an elongate flexible bladder blanket divider having first and second ends, wherein each end rests on at least one apron bladder of an apron bladder bundle, and wherein each apron bladder is between the respective end of the elongate flexible bladder blanket divider and the bottom of a body of water.

BRIEF DESCRIPTION OF THE DRAWINGS

FIGS. 3A-3B illustrate a flow chart of a method for recovering historical artifacts, eradicating invasive species, or revegetating plant life, such as using growth packet; according to embodiments of the present invention;

FIGS. 8a-f depict a front cross-sectional view of the apron bundles configured into Frame Apron Bladder Bundles (FABBs), according to embodiments of the present invention;

DETAILED DESCRIPTION OF THE INVENTION

Figure 1:
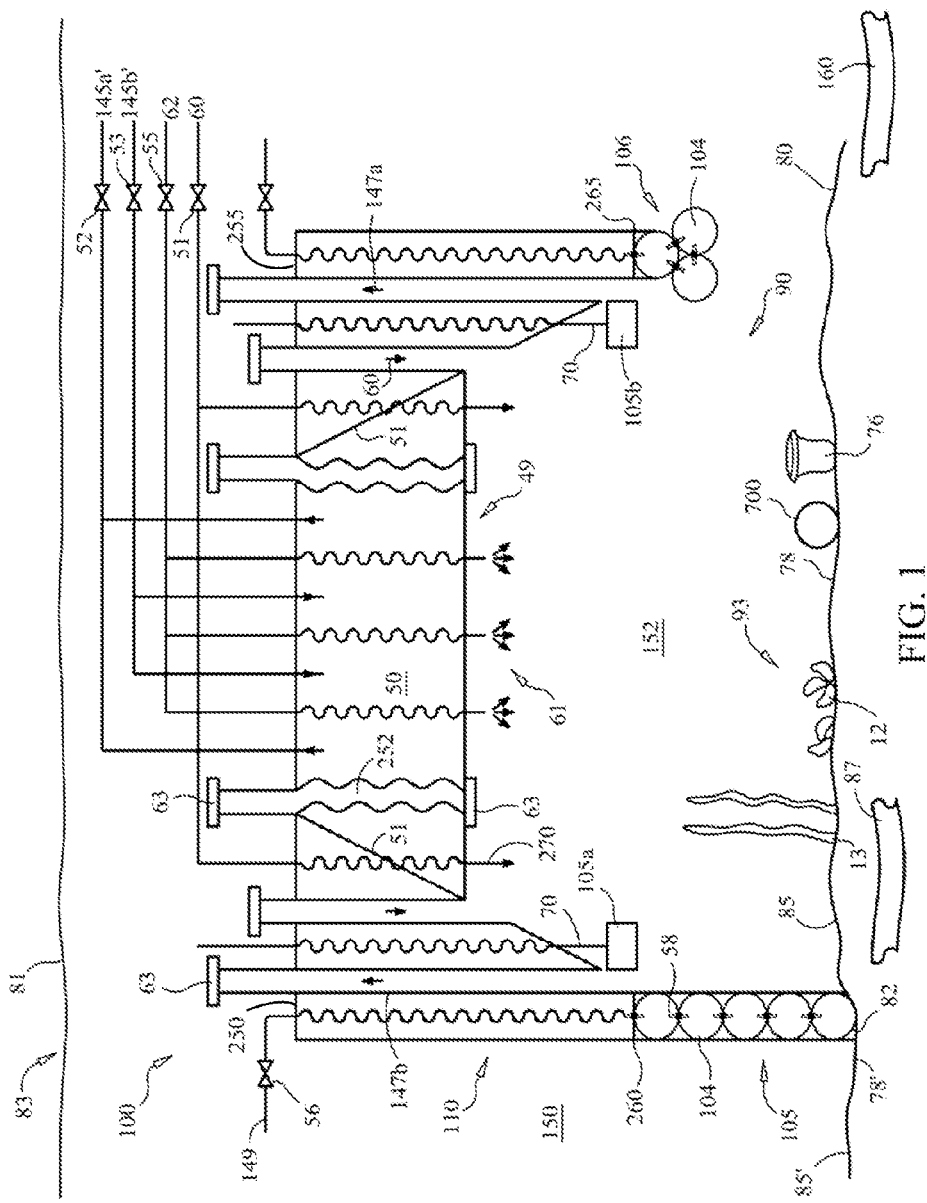
FIG. 1 illustrates a front cross-sectional view of an apparatus for recovery of artifacts and eradication of invasive species in aquatic environments, the apparatus comprising a flexible bladder blanket divider, according to embodiments of the present invention.

FIG. 1 illustrates a front cross-sectional view of an apparatus 100, such as a "Boxplorer" System to aid in the use of an Archaeological Investigative Research & Artifact Recovery tool (AIR & ART) known as the Archaeological Box Explorer (ABE), wherein an open side 90 of the apparatus 100 may be facing a bottom 80 of the body of water 83, and an edge 82 of an apron bladder 104 of an apron bladder bundle 105 of the apparatus 100 may be directly and physically in contact with the bottom 80 of the body of water 83, so that the contained area of water and suspended sediment 152, the contained precipitated sediment 78 and the contained mud 85 may be essentially completely isolated or separated from an uncontained area of water and suspended sediment 150, and the precipitated sediment 78' and the uncontained mud 85' outside the apparatus 100. The body of water 83 comprises a surface 81, water and suspended sediment 150 and the bottom 80 of the body of water 83, wherein the bottom 80 of the body of water 83 may include sediment 78', mud 85' and bedrock 87 and may be adjacent to a body of land 160, such as, for example, a water along a shore, water along an edge of a river, water along an edge of a lakefront, or water along an edge of a beach. The contained precipitated sediment portion 78 and an uncontained precipitated sediment portion 78', may be, for example, contaminated material, the contained mud portion 85 and the uncontained mud portion 85' may be a mixture of earth and water so as to be adhesive, and the bedrock portion 87 may be rock, shale or other hard material that supports the mud, 85 and 85' and/or sediment, 78 and 78'. In some cases, some or all of the contained sediment portion 78 and uncontained sediment portion 78', and/or the contained mud portion 85 and the uncontained mud portion 85' of the bottom 80 of the body of water 83 may contain levels of chemical contamination, such that the levels of chemical contamination may be unhealthful or toxic to people, wildlife, such as fish, or plant life living in the body of water 83. The chemical contamination may be heavy metals such as mercury, lead, or other metals such as chromium, magnesium, manganese, copper, or organics, such as polychlorinated biphenyls (PCB's), dioxins, or halogenated or aromatic solvents such as trichloroethylene, toluene or benzene. Said levels may be as low as 0 to 100 parts per trillion by weight, for example, or at the minimum detection limit of modern analytical instruments for quantifying the level of chemical contamination. In cases for which the levels of contamination may be unhealthful or toxic, it may be desirable or necessary to remove the chemically contaminated portions from the bottom 80 using the apparatus 100 as depicted in FIG. 1.

The apparatus 100 may comprise: viewing devices 105a and 105b, such as waterproof cameras, may be used to display the contained area of water and suspended sediment 152. The apparatus 100 may be a Bladder Boundary System (BBS) or any other appropriate container having water-proof walls. The apparatus 100 uses Bladder Sheets (BSS) 50 capable of flexing and shaping to hold artifacts 76 which may have historical or antique value in place. The Bladder Sheets (BBS) may have multiple layers 51 that comprise a flexible bladder blanket divider 49.

The apparatus 100 comprises: an elongate flexible bladder blanket divider 49 having first and second lateral ends 250, 255 and first and second vertical ends 260, 265; an open bore vertical support 110 operably coupled to the first and second lateral ends 250, 255 and the first and second vertical ends 260, 265; wherein the lateral ends 250, 255 and vertical ends 260, 265 extend into the open bore vertical support 110 and each vertical end 260, 265 rests on at least one apron bladder 104 of an apron bladder bundle 105, 106. The at least one apron bladder 104 is contained in the open bore vertical support 110 and at least one apron bladder 104 is between the vertical ends 260, 265 of the elongate flexible bladder blanket divider 49 and the bottom 80 of the body of water 83 so that the at least one apron bladder 104 releasably forms a seal 82 with the bottom 80 of the body of water 83.

In one embodiment, the Bladder Apron(s) 104 may advantageously rely on a Apron Bladder Bundle(s) 105, 106, such as the Soft Touch Union Bladder System (STUBS) to help form a constant, surface conforming, load balancing soft bladder seal 82 with the bottom 80 of the water bed. Hereinafter, "bladder" is defined as a distensible, flexible membrane or sac containing a liquid having a density greater than the fluid in the body of water 83 or an interlocking internal (endoskeletal) network that helps the bladder retain a solid shape while also having a flexible shape. The bundles 105, 106 may be configured into Frame Apron Bladder Bundles (FABBs), such as High Rise 80a and 80f, A-Frame 80b, A-Frame Mixed 80c, V-Framed 80d, M-Framed 80e designed for "soft touching" the bottom 80 of the body of water such as a sea bed, as depicted in FIGS. 8A-8F and described in associated text.

The Apron bladder(s) 104 or the elongate flexible bladder blanket divider 49 may be made of flexible material selected from the group consisting of polyurethane polymers, silicone polymers, polyester polymers, polystyrene polymers, natural or synthetic rubber, high or low density polyethylene, high or low density polypropylene, and polyamide polymers. The apron bladder(s) 104 may have any appropriate solid geometric shape such as polygon, cubic, cylindrical, spherical, pyramidal, rhomboid or conical. The BBS may shrink the area beneath the elongate flexible bladder blanket divider 49 (Bladder Sheets (BBS)) and reduces the quantity of water to be handled when recovering an artifact 76. In one embodiment, the BBS reduce the quantity of water to be filtered within a contaminated site during artifact 76 recovery by deflating the apron bladders 104 of the BBS by removing the fluid via pipe 149 by opening valve 56. In one preferred embodiment, the apron bladders 104 may be intercommunicating through intercommunicating tubes 58, so that the pressure within the apron bladders 104 is self-equalizing, thereby enabling "soft touching" the bottom 80 of the body of water such as a sea bed, as depicted in FIGS. 8A-8F and described in associated text. Conduits 70 may house coaxial cables or other appropriate wiring to supply the viewing devices 105a and 105b with electricity and to provide a data highway over which pictures of a contained area 93 of artifacts 76 and/or invasive species 12, 13 may be projected to another location for remote viewing. The invasive species 12 may be Zebra Mussels, or 13 Eurasian watermilfoil, ruffe, and other invasive species pose a severe threat to waters and native aquatic plants and animals. Hydrilla is one example of a very invasive plant found "hitchhiking" on rootstocks of ornamental aquatic plants. In addition, the viewing devices 105a and 105b may be equipped with lights for illuminating the contained area 93, such as waterproof electrically powered lights or with light sticks that may be illuminated by chemiluminescence.

The apparatus 100 may be a Suspension Active Mining Process for excavating the contained precipitated sediment portion 78, comprising water/air return 145a' via valve 52, water/air supply 145b' via valve 53 respectively, water/air Jets 62 to agitating devices 61 via a valve 55, and additive site 60, such as a chemical injection system 120, 121, through chemical injector(s) 270 via a valve 51.

The apparatus 100, such as the Suspension Active Mining Process excavates the contained precipitated sediment portion 78 surrounding the artifacts 76 by putting the contained precipitated sediment portion 78 into suspension so that the contained suspended water and sediment 152 results. The apparatus 100, such as the Suspension Active Mining Process uses agitating devices 61, such as jets, augers, props, pumps whips and transports via pipe lines 147a and 147b the suspended contained water and sediment to be processed by the closed-loop piping apparatus 100 or open loop piping apparatus 200 disclosed in U.S. patent application Ser. No. 10/918, 257, authored by the same inventor, Thomas J. Kryzak, as the current application and is hereby incorporated by reference.

The apparatus 100, such as the General Exploration Advanced Research System (GEARS) uses the Dive Inspection Visual Exploration System (DIVES), the Dive Integrated Mechanical Extraction System (DIMES), and the Alternative Recovery Method System (ARMS) together with the Granting earth Box (GEB). The DIVES uses the GEB's light weight, clear view, screen vision camera 105b for "hands on" artifact 76 recovery. The DIMES uses the GEB's "mechanical tools" 116 to retrieve artifacts 76 by but not limited to drilling, coring sawing, grinding, impacting, blasting or jetting delivery techniques using air, gases, bubbles, chemicals, materials, water or other appropriate substances or combinations. The ARMS uses the apron bladder bundle 105, 106, such as the GEB's Bladder Order System to infiltrate, surround and/or support the artifacts 76 with the Bladder Inflating Net System (BINS).

Referring to FIG. 1, the apparatus 100 may be recharged with uncontaminated water from an independent water supply other than the body of water 83 (not shown) via intake pipes 60. Intake pipes 60 and transporting pipes 147a and 147b may be opened for use by removing hatches 63.

Figure 2:
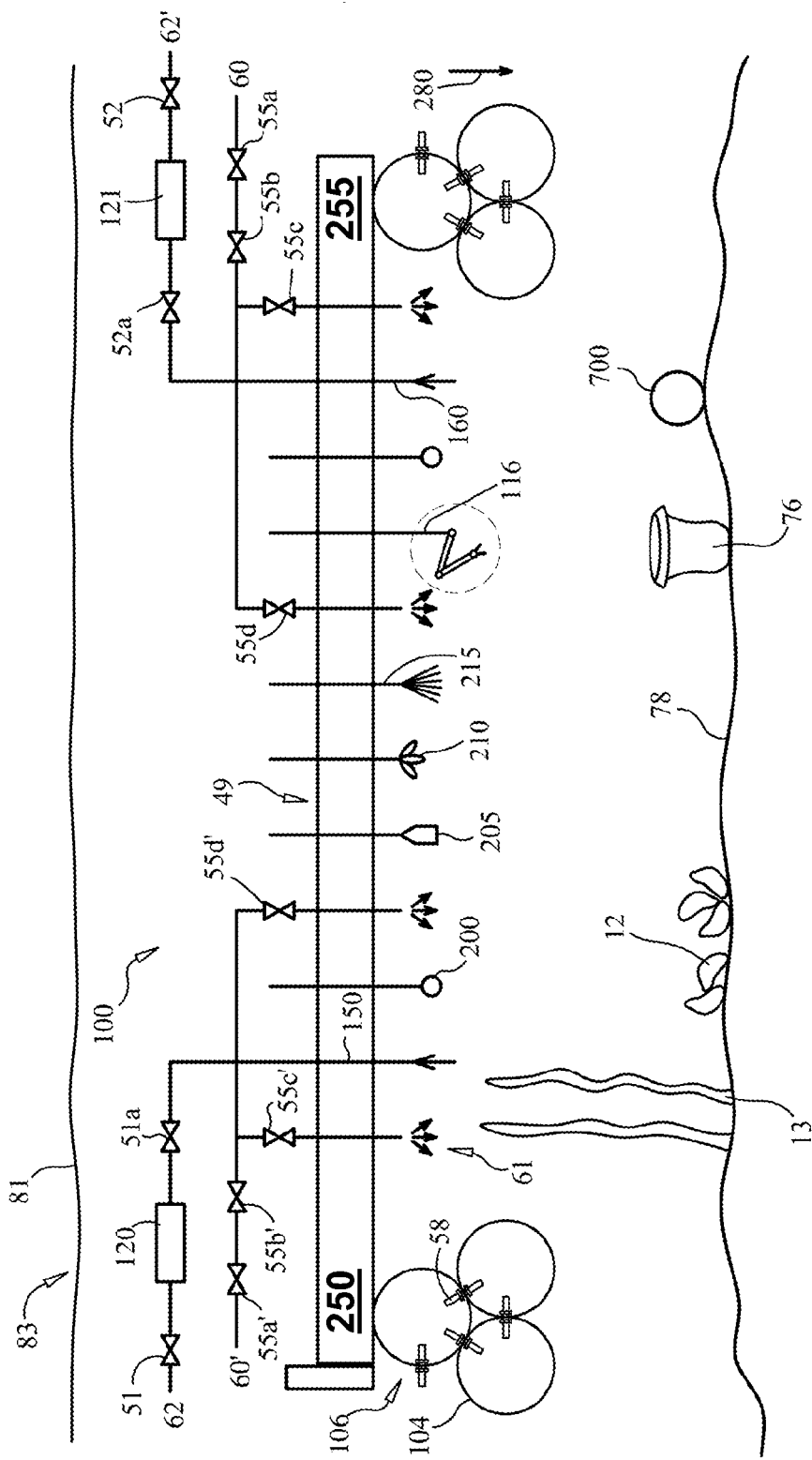
FIG. 2 depicts a front cross-sectional view of the elongate flexible bladder blanket divider of FIG. 1, showing exploded views of devices inserted through the elongate flexible bladder blanket divider, according to embodiments of the present invention.
Figure 6:
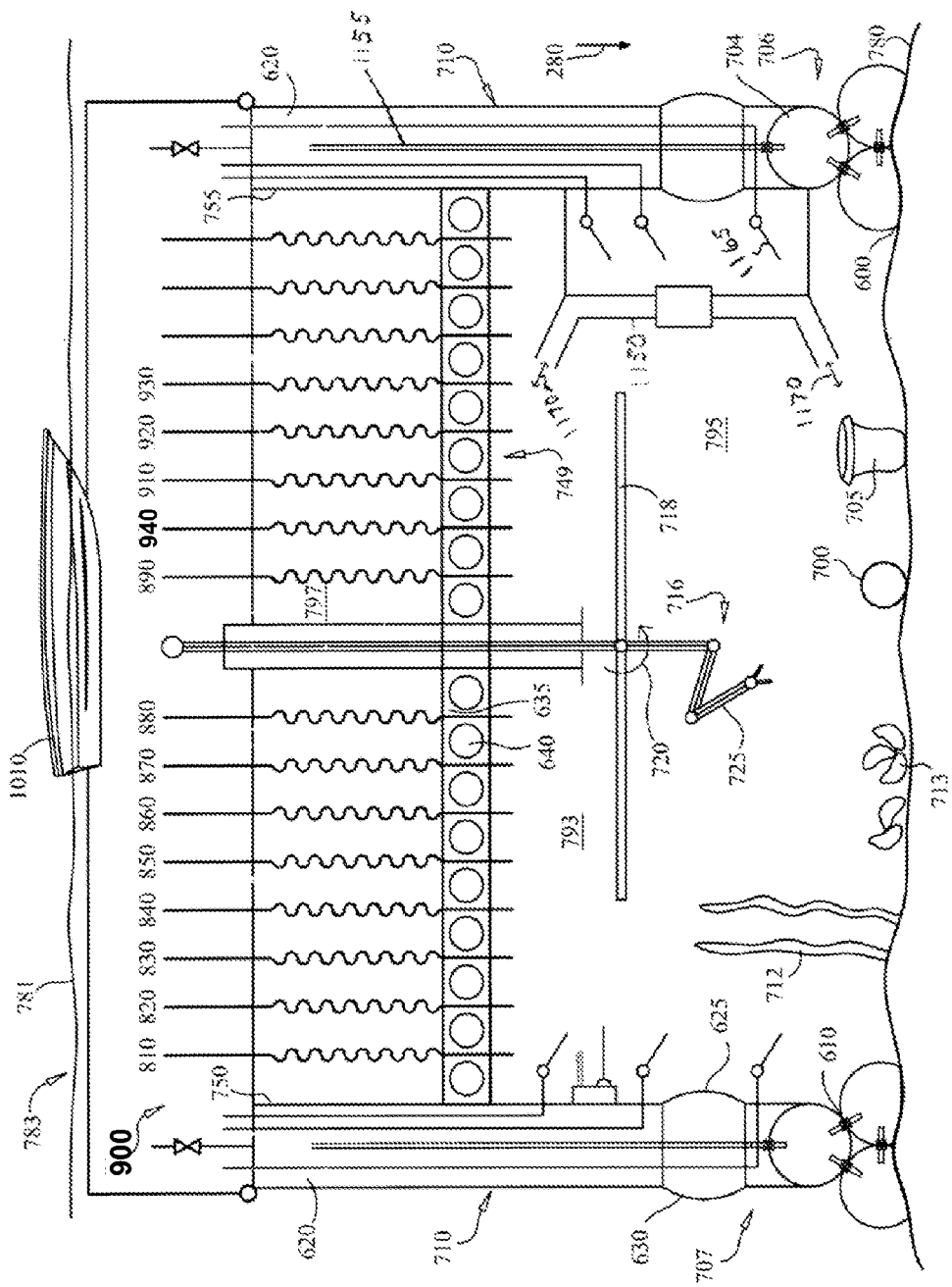
FIG. 6 depicts a front cross-sectional view of an apparatus for recovering historical artifacts, eradicating invasive species, or restoring plant life, according to embodiments of the present invention.

FIG. 2 depicts a front cross-sectional view of the elongate flexible bladder blanket divider 49 of FIG. 1, showing exploded views of the agitating devices 210, 215, 61, recovery devices 216, or processing devices 120 and 121 or sample sites(s) 205 having been inserted through the elongate flexible bladder blanket divider 49 of the apparatus 100. Processing devices 120 and 121 for adding chemical additives to exterminate invasive species 12 or 13 comprise adder ports 62 and 62' introducing chemical additives such as chlorine, hydrogen peroxide, accelerators, decelerators, feeding, starving, precluding light or suffocating agents through openings or pipes 150 and 160 in the bladder to control the growth of or kill the invasive organisms. The processing devices 120 and 121 comprise control valves 51, 51a and 52 and 52a respectively for starting and stopping flow into the processing devices 120 and 121. The apparatus 100 comprises a water/air supply 60 and 60' for supplying water/air to agitation devices 61 via pipes 55a'-c', and 55a-c respectively, said pipes have been inserted through the elongate flexible bladder blanket divider 49. The sample site 205 may be used for taking samples for analysis of the level of contamination of the contained water and suspended sediment 152 and for inserting growth packets 700 for revegetation. Alternatively, the growth packets 700 may be introduced through hatch 63 of growth packet introduction system 252. The growth packets 700 are depicted in FIGS. 1 and 6, infra, and described in associated text and have been previously disclosed in U.S. patent application Ser. No. 10/918,257, cited herein, authored by the same inventor, Thomas J. Kryzak, and are hereby incorporated by reference.

In one embodiment, the apparatus 100 may be used for recovering historical artifacts 76, eradicating invasive species 12, 13 or restoring plant life, comprising: an elongate flexible bladder blanket divider 49 having first and second ends, 250, 255, wherein each end 250, 255 rests on at least one apron bladder 104 of an apron bladder bundle 105, 106, and wherein each apron bladder 104 is between the respective end 250, 255 of the elongate flexible bladder blanket divider 49 and the bottom 80 of a body of water 83.

Figure 4:
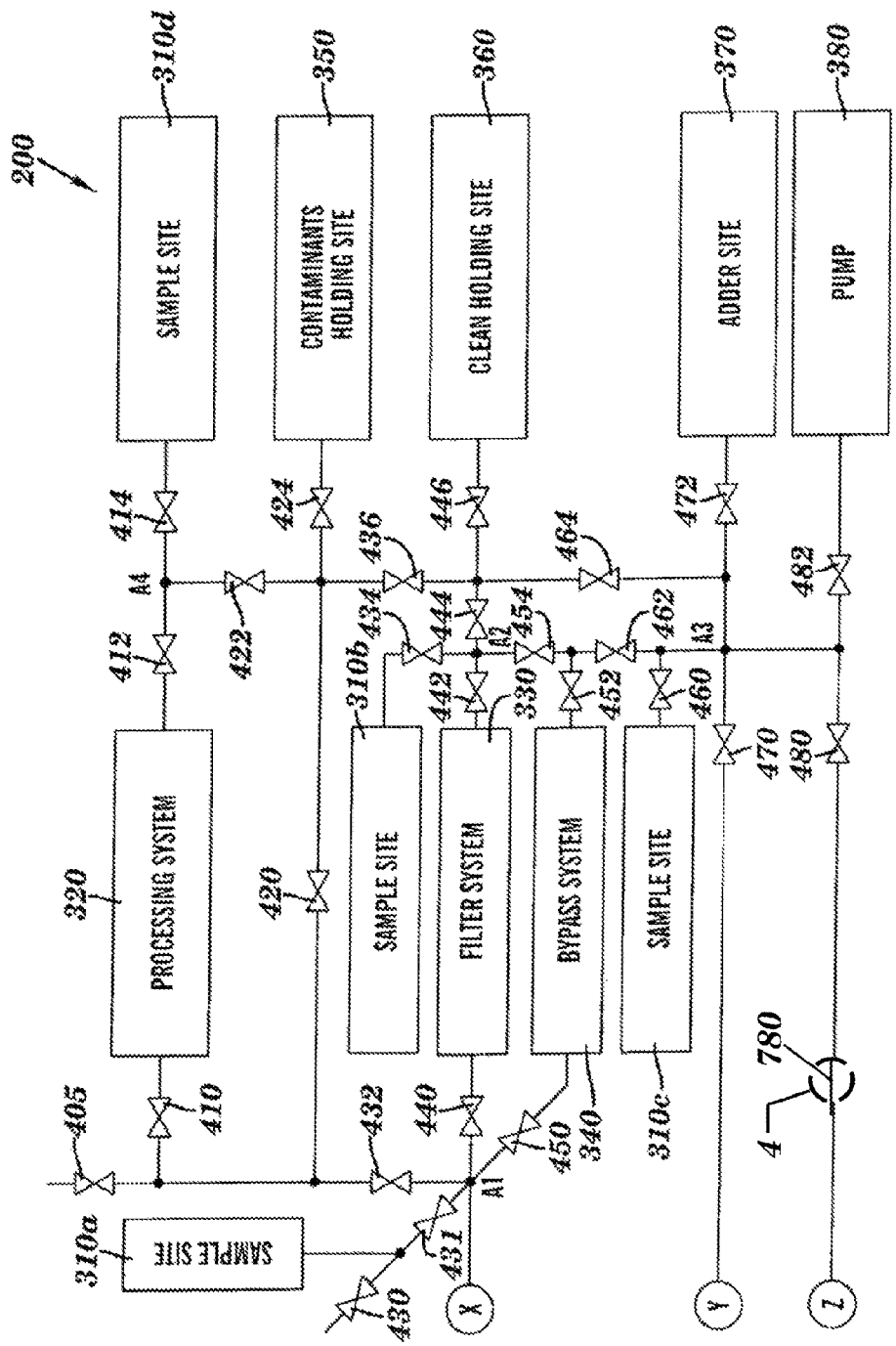
FIG. 4 depicts an apparatus 200 for removing and treating materials in a body of water, disclosed in U.S. patent application Ser. No. 10/918,257, authored by the same inventor, Thomas J. Kryzak, as the current application, and is hereby incorporated by reference.
Figure 5:
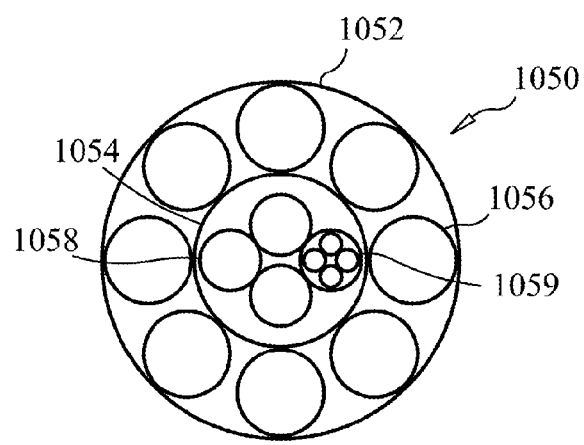
FIGS. 5, 9, 10, and 11 depict front cross-sectional views of the interlinking network of reinforcing bundles, according to embodiments of the present invention.

FIG. 4 depicts an apparatus 200 for removing and treating materials in a body of water, disclosed in U.S. patent application Ser. No. 10/918,257, authored by the same inventor, Thomas J. Kryzak, as the current application, hereby incorporated by reference, showing growth packets 780.

FIGS. 1-2 and 6 depict a front cross-sectional view of an apparatus 900, such as the Stretch Exploration Process (SEP) also offers the Aquatic Controlled Eradication Systems (ACES). The Controlled Invasive Species Travel System (CISTS) uses the Controlled Aquatic Vegetation Eradication System (CAVES) along with the Bladder Boundary System (BBS) to protect native species from displacement and destruction. The Soft Touch Union Bladder System protects the bottom 80 of the body of water 83 (e.g. sea bed) during project work and enables the use of Species Life Cycle Catalysts (LCCS). As LCCS accelerators or decelerators, additives or stabilizers, inhibitors, reducers, eliminators, produce a profound effect on the preservation of native species. This feeding or starving with light, $CO_2$, oxygen, water movement, chemicals, microbes of algae can either enhance or suffocate life. The "Closed Loop Piping System", i.e. the apparatus 100 disclosed in U.S. patent application Ser. No. 10/918,257, authored by the same inventor, Thomas J. Kryzak, as the current application and is hereby incorporated by reference can filter in or out life to the selected species. In areas where the invasive species 13 has been annihilated new introductions of native species can be reintroduced using the SEP to protect, promote, feed, water, energize, and advance growth.

Figure 3A:
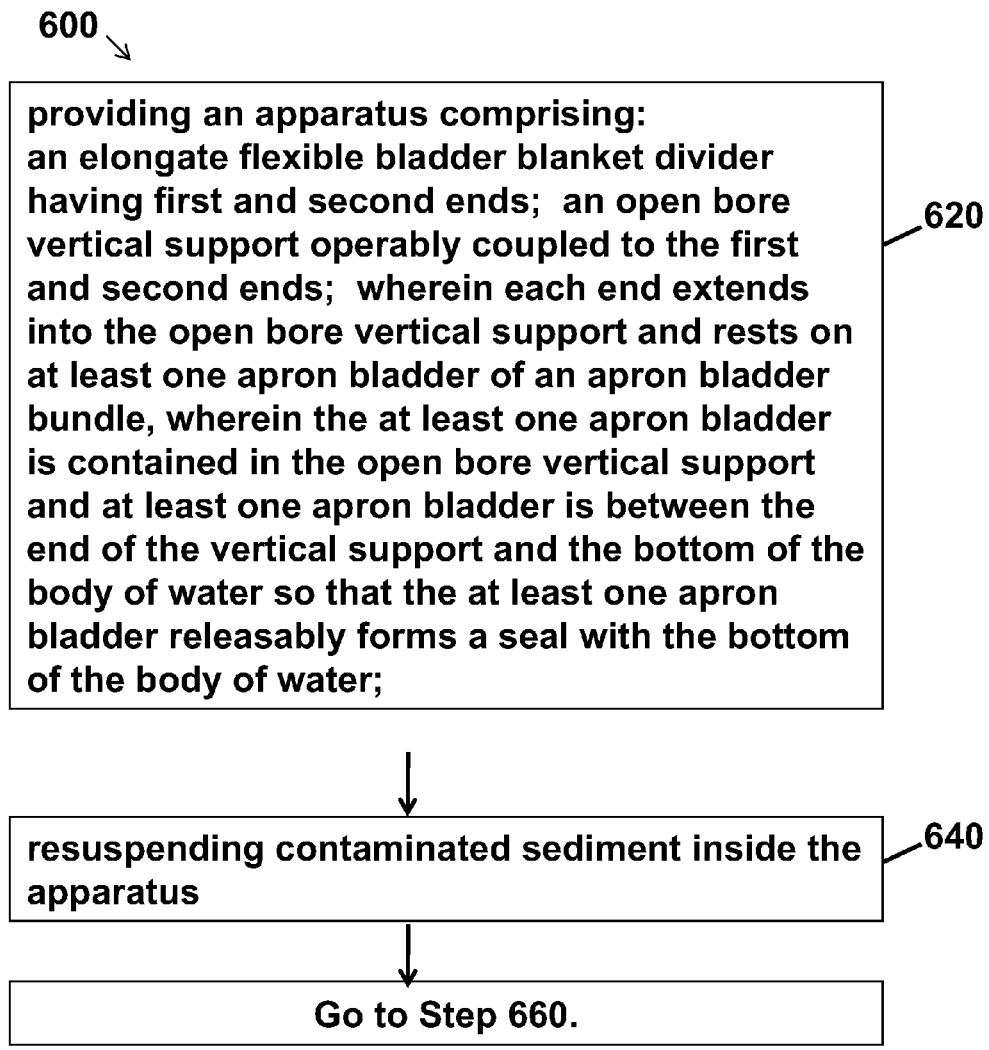

FIGS. 3A and 3B illustrates a flow chart of a method 600 of recovering historical artifacts 76, eradicating invasive species 12, 13, or revegetating plant life, such as using growth packet 700. In the step 620 of the method 600, recovering historical artifacts 76, eradicating invasive species 12, 13, or revegetating plant life in contaminated bottoms 80 of a body of water 83, comprising: providing an apparatus 100 comprising: an elongate flexible bladder blanket divider 49 having first and second ends 250, 255 and first and second vertical ends 260, 265; an open bore vertical support 110 operably coupled to the first and second lateral ends 250, 255 and the first and second vertical ends 260, 265; wherein each lateral end 250, 255 extends into the open bore vertical support 110 and rests on at least one apron bladder 104 of an apron bladder bundle 105, 106. The at least one apron bladder 104 is contained in the open bore vertical support 110 and at least one apron bladder 104 is between the vertical ends 260, 265 of the elongate flexible bladder blanket divider 49 and the bottom 80 of the body of water 83 so that the at least one apron bladder 104 releasably forms a seal 82 with the bottom 80 of the body of water 83.

In the step 660 of the method 600, removing the contained water and contaminated sediment 152, resulting in lowering the elongate flexible bladder blanket divider 49 so that the historical artifact 76 may be extracted with a robotic arm 116, chemicals may be introduced using chemical injector(s) 270 to eradicate the invasive species 12, 13, or growth packets 700 may be introduced using the sample site 205 or growth packet introduction system 252 to revegetate the bottom 80 of the body of water 83. Hereinafter, "revegetate" is defined as to replant native species in place of invasive plant species.

The apparatus 100, 900 may be "lowered" into position in the direction of the arrow 280 depicted in FIGS. 2 and 6, by mechanical or other means, in accordance with the step 660 of the method 600, as described infra, and depicted in FIG. 2. By introducing air/water/materials into the interior 50 of the apparatus 100, 900, as described in the step 660 of the method 600, the elongate flexible bladder blanket divider 49 may be moved deeper into the bottom 80 of the body of water 83, resulting in creating a releasable seal 82 at the edge 78' of the apparatus 100, that may be formed from sediment 78' and mud 85' of the bottom 80 outside of the apparatus 100, 900 pressing against the edge 78' and either sediment 78, mud 85 or the bedrock 87, depending on how deep the apparatus 100, 900 was driven. The releasable seal 82 thereby may isolate the interior 93 from the water 150, and/or the bottom 80 of the body of water 83, that may be outside the apparatus 100, 900.

In the providing step 620 of the method 600, the apparatus 100, 900 may be partially submerged or completely submerged below the surface 81 of the body of water 83, as long as the edge 78' directly and physically contacts the bottom 80 of the body of water 83.

In the resuspending step 640 of the method 600, agitating devices 61, such as augers, spray heads, whips, props, fluid and gas distribution devices, etc. may provide agitation of the interior 93 of the apparatus 100, 900, resulting in suspending a portion or essentially all of the bottom material, e.g., 78, or 85 of the bottom 80 that may be contained in the interior 93 of the apparatus 100, wherein the suspended portion may include the contaminated material. The contaminated material may be a range from 0-100 percent by weight of the total material of the bottom 80 in the interior 93 of the vessel 110.

In the step 640, a rate of agitation necessary to suspend the contaminated material, for example, in locations around the artifact 76 may be empirically determined, based on the weight percent of the bottom material targeted for removal, wherein higher agitation may be needed to suspend more of the portion of the bottom 80 having contaminated material. The contaminated suspended material in the water and suspended material 152 may be conveyed through the "closed loop" piping system or "open loop" piping system to a processing system 140 such as a filter system having in-line chemical testing equipment in order to identify the suspended materials that may be contaminated and to separate them from a fluid such as water in the suspended material and water 152, as disclosed in U.S. patent application Ser. No. 10/918,257 and hereby incorporated by reference.

In an embodiment of the method 600, in the step 620, video monitoring using devices 820, 850 and 910, the lowering of the elongate flexible bladder blanket divider 49, 749 so that the devices 820, 850 and 910 visualize the contours of a bottom of a body of water 780, wherein the contours are created by objects selected from the group consisting of historical artifacts, metal drums, rocks, debris, wherein said visualization of the contours of the bottom of the body of water enables an operator of the apparatus to lower the elongate flexible bladder blanket divider 49, 749 to a distance within from about 1 inch or greater of the objects without touching the object.

In an embodiment, removing the resuspended contaminated sediment 795 results in greater than 95 percent by weight removal of the chemical contamination or greater than 95 percent by weight eradication of the invasive species 712, 713.

In an embodiment, introducing chemicals, accelerators, decelerators, feeding, starving, precluding light or suffocating agents through openings in the bladder controls the growth of or kills the invasive species 712, 713.

FIG. 6 depicts a front cross-sectional view of an apparatus for recovering historical artifacts 705, eradicating invasive species 712, 713, or restoring plant life with, for example, growth packets 700, comprising: an elongate flexible bladder blanket divider 49, 749 having first and second ends, 750, 755; and an open bore vertical support 710 operably coupled to the first and second ends 750, 755; wherein each end 750 755 extends into the open bore vertical support 710 and rests on at least one apron bladder 704 of an apron bladder bundle 706, 707, and wherein the at least one bladder 704 is contained in the open bore vertical support 710 support and at least one apron bladder 704 is between the end 750, 755 of the vertical support 710 and the bottom 780 of the body of water 783.

The apparatus 900 comprises a recirculating/heating/cooling tube bundle 1150. The tube bundle 1150 may be a recirculating heat exchanger capable of controlling the temperature of the contained water and resuspended sediment 795 in the second compartment 793 from about 5° C. to about 50° C. Arrows 1170 show fluid from the second compartment 793 recirculates in and out of the recirculating/heating/cooling tube bundle 1150. The apparatus 900 may comprise agitation devices 1165 which may eject air/water supplied by feed lines 1160.

FIG. 6 depicts a front cross-sectional view of the interior 635 of the elongate flexible bladder blanket divider 49, 749 comprises an interlinking network of reinforcing bundles 640.

In one embodiment, the apparatus 900, comprising a recovery device, 716, a eradicating device 890, or a revegetation device 930 selected from the group consisting of GPS 940, lights, 810, monitoring 820, sonar 830, radar 840, cameras 850, chemical injectors 860, robotic calipers 716, agitating devices 870, augers 880, drill heads 890, suction devices 900, video monitoring devices 910, and nozzles 920, inserted through the elongate flexible bladder blanket 749.

FIG. 6 depicts a recovery device 716, such as robotic calipers 725 for grasping artifacts 705. The recovery device 716 may slide longitudinally along gantry 718, and pivot from about 0 to about 360° in the direction of arrow 720. The robotic caliper comprises an electrode for carbon arc gouging, an underwater torch, an underwater heat cauterizer for ballistically heating to destroy underwater vegetation, a shovel, a drill, core maker, a lazer for precision cutting metal, artifacts, vegetation, glass, stone, a chipper blade attachment, a saw, a vibrator for cleaning fine debris off artifacts, a light, a camera, a sonar transmitter/receiver, x-ray or magnetic metal detector, a screen for segregating and isolating small objects having diameters from about 0.1 mm and greater from smaller objects.

In one embodiment, the apron bladders 704 contain an intercommunicating fluid that is denser than the fluid of the outside environment so that the apron bladders 704 sink to the bottom 780 of the body of water 83 and conform to the contours of the bottom 80 of the body of water 83, thereby forming a releasable seal 600 between the apron bladders 104, 704 and the bottom 780 of the body of water 783. The intercommunicating fluid may be changed to the apron bladders 704 through feed tubes 1155.

In one embodiment, the fluid is a slurry mix having a density greater than the fluid of the body of water 83 so that transferring the slurry mix into the apron bladders 104, 704 through intercommunicating tubes 610 causes the apron bladder bundles 706, 707 to become heavier than the fluid of the body of water 83 so the bladder bundles 706, 707 rest on the bottom 780 of the body of water 783.

In one embodiment, the video monitoring device 820 or camera 850 visualizes the contours of a bottom 80 of the body of water 83, wherein the contours are created by objects selected from the group consisting of historical artifacts, metal drums, rocks, debris, wherein said visualization of the contours of the bottom 780 of the body of water 783 enables an operator of the apparatus 900 to lower the elongate flexible bladder blanket divider 49, 749 in a direction of the arrow 280 to a distance within from about 1 inch or greater of the objects without touching the object.

In one embodiment, the temperature of the environment inside 793 the apparatus 900 is increased or decreased relative to the outside temperature by introducing heating or refrigerating fluids or gases into the open bores 620 of the at least one vertical support 710.

In one embodiment, an inner 625 or outer 630 hatch door opens into the interior of either vertical support to provide access into the apparatus 900, including the apron bladders 704.

In one embodiment, the interior 635 of the elongate flexible bladder blanket divider 49, 749 comprises an interlinking network of reinforcing bundles 640.

In one embodiment, the interlinking network of reinforcing bundles 640 have a shape selected from the group consisting of polygon, cubic, cylindrical, spherical, pyramidal, rhomboid or conical, and combinations thereof.

FIGS. 5, 9, 10, and 11 depict front cross-sectional views of the interlinking network of reinforcing bundles 1050, 1090, 1120, and 1100. The reinforcing bundles 1050, 1090, 1120, and 1100 may be solid tubular structures to form a honeycomb reinforcing structure 1120 such as the bundles 1110, depicted in FIG. 10. Alternatively, they may be hollow tubes 1105, 1096, 1056, as in FIGS. 11, 9 and 5. The tubes 1096 and 1056 may be arranged in concentric rings as in FIGS. 5 and 9. Generally, the greater number of tubes leads to a stronger, but less flexible bundle. The bundles may be made using nano technology in which the tubes may be hollowed out by a chemical reaction such as selective oxidation.

In one embodiment, the elongate flexible bladder blanket divider 49, 749 is made of a material selected from the group consisting of polyurethane polymers, silicone polymers, polyester polymers, polystyrene polymers, natural or synthetic rubber, high or low density polyethylene, high or low density polypropylene, and polyamide polymers.

In one embodiment, the eradicating device 890 is at least one chemical injector 860 for controlling the growth of the invasive species 712, 713, in the body of water 783 selected from the group consisting of invasive plant species, zebra muscles and combinations thereof.

In one embodiment, the invasive species are selected from the group consisting of toxic caulerpa taxifolia, loosestrife, milfoil, ruffe and hydrilla.

In one embodiment, the recovery device 716 is a robotic caliper for removing the historical artifact from the body of water.

In one embodiment, the robotic caliper comprises an electrode for carbon arc gouging, an underwater torch, an underwater heat cauterizer for ballistically heating to destroy underwater vegetation, a shovel, a drill, core maker, a lazer for precision cutting metal, artifacts, vegetation, glass, stone, a chipper blade attachment, a saw, a vibrator for cleaning fine debris off artifacts, a light, a camera, a sonar transmitter/receiver, x-ray or magnetic metal detector, a screen for segregating and isolating small objects having diameters from about 0.1 mm and greater from smaller objects.

In one embodiment, the revegetation device 930 is a nozzle 920 for planting a growth packet 700 in the bottom of the body of water.

In an embodiment, the apparatus 900 includes a system for recovering historical artifacts, eradicating invasive species, or restoring plant life in contaminated bottoms of a body of water, comprising: a water craft 1000 and a mechanical lifting device 1010; and the apparatus 900.

Figure 7:
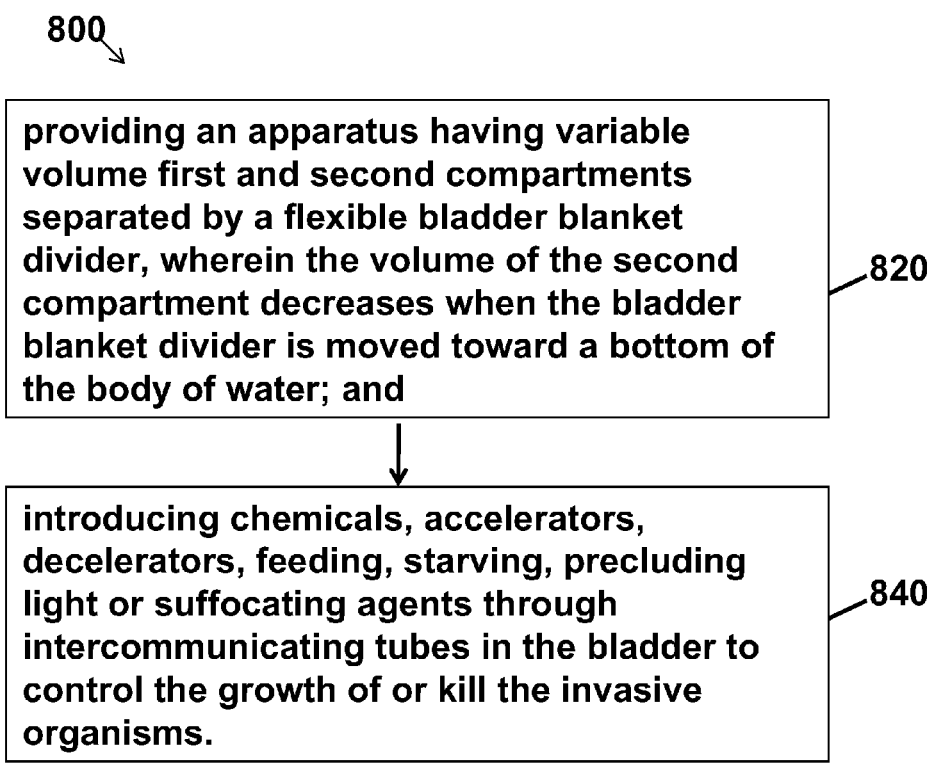
FIG. 7 illustrates a flow chart of a method for controlling invasive organisms such as milfoil, zebra mussels, certain plants that grow out of control, according to embodiments of the present invention.
Figure 10:
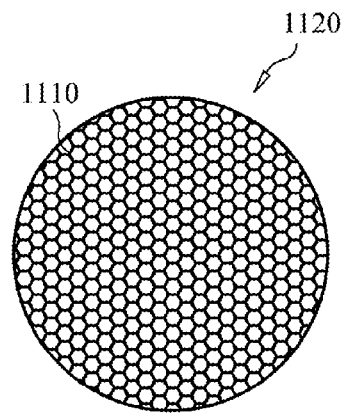
Figure 9:
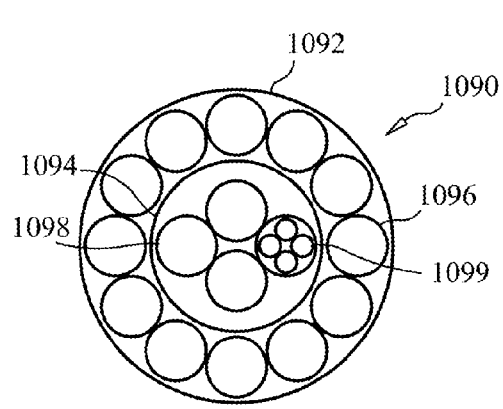
Figure 11:
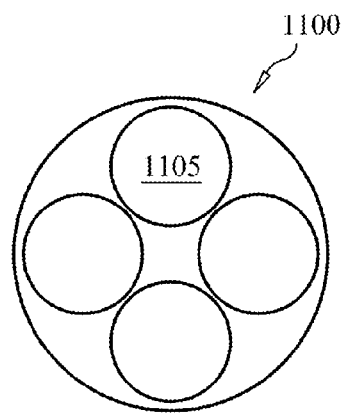

FIG. 7 illustrates a method 800 for controlling invasive organisms 12, 13 such as milfoil, zebra mussels, certain plants that grow out of control. In a step 820 of the method 800, an apparatus 900 having variable volume first and second compartments 793, 797, separated by a flexible bladder blanket divider 49, 749 is provided. In the step 820, the volume of the second compartment 793 of the apparatus 900 decreases when the bladder blanket divider 49, 749 is moved in a direction of the arrow 280 toward a bottom 780 of the body of water 783. In a step 840 of the method 800, chemicals, accelerators, decelerators, feeding, starving, precluding light or suffocating agents are introduced through intercommunicating tubes 58 in the bladder 104, 704 to control the growth of or kill the invasive organisms.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

I claim:

1. An apparatus for recovering historical artifacts, eradicating invasive species, or restoring plant life in contaminated bottoms of a body of water, comprising:
   an elongate flexible bladder blanket divider having first and second ends; and an open bore vertical support operably coupled to the first and second ends,
   wherein each end extends into the open bore vertical support, and rests on at least one apron bladder of an apron bladder bundle, and
   a releasable seal between the at least one bladder and the bottom of the body of water.

2. The apparatus of claim 1, comprising a recovery device, a eradicating device, or a revegetation device selected from the group consisting of GPS, lights, sonar, radar, cameras, chemical injectors, robotic calipers, agitating devices, augers, drill heads, suction devices, video monitoring devices, and nozzles, inserted through the elongate flexible bladder blanket.

3. The apparatus of claim 2, wherein the chemical injectors are ports for introducing chemical additives such as chlorine, hydrogen peroxide, accelerators, decelerators, for feeding, starving, precluding light or suffocating agents to control the growth of or kill the invasive species.

4. The apparatus of claim 1, wherein the at least one apron bladder contains an intercommunicating fluid that is denser than the fluid of the outside environment so that the apron bladders sink to the bottom of the body of water and conform to the contours of the bottom of the body of water.

5. The apparatus of claim 4, wherein the fluid is a slurry mix having a density greater than the fluid of the body of water so that transferring the slurry mix into the apron bladders causes the bladder bundles to become heavier than the fluid of the body of water so the bladder bundles rest on the bottom of the body of water.

6. The apparatus of claim 2, wherein the video monitoring device visualizes the contours of a bottom of a body of water, wherein the contours are created by objects selected from the group consisting of historical artifacts, metal drums, rocks, debris, wherein said visualization of the contours of the bottom of the body of water enables an operator of the apparatus to lower the elongate flexible bladder blanket divider to a distance within from about 1 inch or greater of the objects without touching the object.

7. The apparatus of claim 1, comprising a sample site inserted through the flexible blanket divider.

8. The apparatus of claim 1, comprising an air/water agitation device through the flexible blanket divider.

9. The apparatus of claim 1, wherein the interior of the elongate flexible bladder blanket divider comprises an interlinking network of reinforcing bundles.

10. The apparatus of claim 9, wherein the interlinking network of reinforcing bundles have a shape selected from the group consisting of polygon, cubic, cylindrical, spherical, pyramidal, rhomboid, and conical.

11. The apparatus of claim 1, wherein the elongate flexible bladder blanket divider is made of a material selected from the group consisting of polyurethane polymers, silicone polymers, polyester polymers, polystyrene polymers, natural or synthetic rubber, high or low density polyethylene, high or low density polypropylene, and polyamide polymers.

12. The apparatus of claim 2, wherein the eradicating device is at least one chemical injector for controlling the growth of the invasive species in the body of water selected from the group consisting of invasive plant species, zebra mussels and combinations thereof.

13. The apparatus of claim 1, wherein the invasive species are selected from the group consisting of toxic caulerpa taxifolia, loosestrife, milfoil, ruffe, hydrilla, and combinations thereof.

14. The apparatus of claim 2, wherein the recovery device is a robotic caliper for removing the historical artifact from the body of water.

15. The apparatus of claim 14, wherein the robotic caliper comprises an electrode for carbon arc gouging, an underwater torch, an underwater heat cauterizer for ballistically heating to destroy underwater vegetation, a shovel, a drill, core maker, a lazer for precision cutting metal, artifacts, vegetation, glass, stone, a chipper blade attachment, a saw, a vibrator for cleaning fine debris off artifacts, a light, a camera, a sonar transmitter/receiver, x-ray or magnetic metal detector, a screen for segregating and isolating small objects having diameters from about 0.1 mm and greater from smaller objects.

16. The apparatus of claim 2, wherein the revegetation device is a nozzle for planting a growth packet in the bottom of the body of water.

17. The apparatus of claim 1, comprising a recirculating/heating/cooling tube bundle.

18. A system for recovering historical artifacts, eradicating invasive species, or restoring plant life in contaminated bottoms of a body of water, comprising:
  a water craft; and
  an apparatus, comprising:
    an elongate flexible bladder blanket divider having first and second ends, and
    an open bore vertical support operably coupled to the first and second ends,
      wherein each end extends into the open bore vertical support, and rests on at least one apron bladder of an apron bladder bundle, and
      wherein the at least one bladder is contained in the open bore vertical support and at least one apron bladder is between the end of the vertical support and the bottom of the body of water.

19. An apparatus for releasably sealing to a bottom of a body of water, comprising:
  an elongate flexible bladder blanket divider 749 having an interior 635 and first and second ends 750, 755,
    wherein the interior 635 of the elongate flexible bladder blanket divider 49, 749 comprises an interlinking network of reinforcing bundles 640;
    wherein each end rests on at least one apron bladder 704 of an apron bladder bundle 706, 707,
    so that an apron bladder 104 is between the respective end of the elongate flexible bladder blanket divider 749 and the bottom 780 of a body of water 783; and
  a releasable seal 82 between the apron bladder and the bottom 80 of the body of water.

20. The apparatus of claim 19, wherein the at least one apron bladder contains a liquid having a density greater than the fluid in the body of water so that transferring the fluid into the apron bladders through intercommunicating tubes 610 causes the apron bladder bundles 706, 707 to become heavier than the fluid of the body of water 83 so the bladder bundles 706, 707 rest on the bottom 780 of the body of water 783.

21. The apparatus of claim 19, wherein the at least one apron bladder is configured into Frame Apron Bladder Bundles (FABBs), adapted for "soft touching" the bottom of the body of water.

22. The apparatus of claim 21, wherein the Frame Apron Bladder Bundles (FABBs) are selected from the group consisting of High Rise apron bladder bundles, A-Frame apron bladder bundles, A-Frame Mixed apron bladder bundles, V-Framed apron bladder bundles, and M-Framed apron bladder bundles.

23. The apparatus of claim 19, wherein the at least one apron bladder is made of flexible material selected from the group consisting of polyurethane polymers, silicone polymers, polyester polymers, polystyrene polymers, natural or synthetic rubber, high or low density polyethylene, high or low density polypropylene, and polyamide polymers.

24. The apparatus of claim 19, wherein the at least one apron bladder has a geometric shape selected from the group consisting of a polygon shape, a cubic shape, a cylindrical shape, a spherical shape, a pyramidal shape, a rhomboid shape, and a conical shape.

25. The apparatus of claim 19, comprising intercommunicating tubes, so that the pressure within the apron bladders is self-equalizing, thereby enabling "soft touching" the bottom of the body of water.

26. The apparatus of claim 19, wherein the reinforcing bundles are solid tubular structures that form a honeycomb reinforcing structure.

27. The apparatus of claim 19, wherein the reinforcing bundles are hollow tubes.

28. The apparatus of claim 27, wherein the hollow tubes form concentric rings.

29. The apparatus of claim 27, wherein the hollow tubes are hollowed out by selective oxidation.

30. A method of recovering historical artifacts, eradicating invasive species, or revegetating plant life in contaminated bottoms of a body of water, comprising:
  providing an apparatus comprising:
    an elongate flexible bladder blanket divider having first and second ends,
      wherein each end rests on at least one apron bladder of an apron bladder bundle, and
      wherein each apron bladder is between the respective end of the elongate flexible bladder blanket divider and the bottom of a body of water; and
  releasably sealing the at least one apron bladder to the bottom of the body of water.

31. The method of claim 30, comprising:
  resuspending contaminated sediment inside the apparatus; and
  removing the resuspended contaminated sediment, resulting in lowering the elongate flexible bladder blanket divider so that the artifact may be extracted with a robotic arm, chemicals may be introduced using chemical injectors to eradicate the invasive species, or growth packets may be introduced using nozzles to revegetate the bottom of the body of water.

32. The method of claim 30, comprising: video monitoring the lowering of the elongate flexible bladder blanket divider so that the video monitoring device visualizes the contours of a bottom of a body of water, wherein the contours are created by objects selected from the group consisting of historical artifacts, metal drums, rocks, debris, wherein said visualization of the contours of the bottom of the body of water enables an operator of the apparatus to lower the elongate flexible bladder blanket divider to a distance within from about 1 inch or greater of the objects without touching the object.

33. The method of claim 30, wherein removing the resuspended contaminated sediment results in greater than 95 percent by weight removal of the chemical contamination or greater than 95 percent by weight eradication of the invasive species.

34. The method of claim 30, wherein introducing chemicals, accelerators, decelerators, feeding, starving, precluding light or suffocating agents through openings in the bladder controls the growth of or kills the invasive species.

35. The method of claim 30, comprising providing a sample site for taking samples for analysis of the level of contamination of the contained water and suspended sediment and for inserting growth packets for revegetation.

36. The method of claim 30, comprising providing a water/air supply for supplying water/air to agitation devices via pipes that have been inserted through the elongate flexible bladder blanket divider.

37. The method of claim 30, comprising:
 raising or lowering the apparatus using a mechanical device of the water craft.

* * * * *